(No Model.)
T. P. WISE.
PLOW ATTACHMENT.
No. 255,066. Patented Mar. 14, 1882.
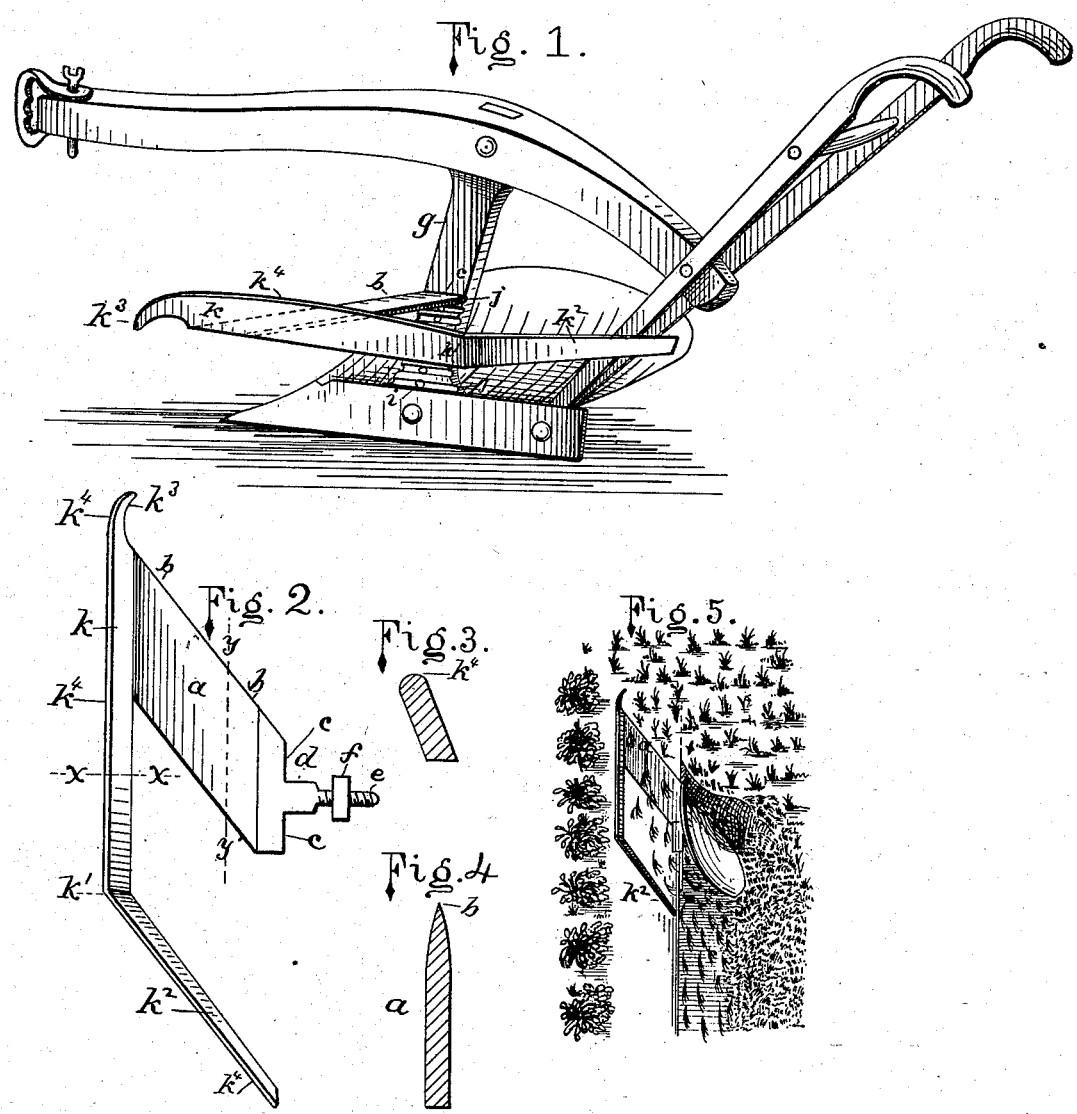
WITNESSES:
Thos. Houghton.
W. Read
INVENTOR:
Thos. P. Wise
BY
ATTORNEYS.

UNITED STATES PATENT OFFICE.

THOMAS P. WISE, OF RICHMOND, VIRGINIA.

PLOW ATTACHMENT.

SPECIFICATION forming part of Letters Patent No. 255,066, dated March 14, 1882.

Application filed December 9, 1881. (No model.)

*To all whom it may concern:*

Be it known that I, THOMAS P. WISE, of Richmond, in the county of Henrico and State of Virginia, have invented a new and Improved Plow Attachment; and I do hereby declare that the following is a full, clear, and exact description of the same, reference being had to the accompanying drawings, forming part of this specification, in which—

Figure 1 is a perspective view of a plow having my improved attachment secured thereto. Fig. 2 is a perspective view of my improved plow attachment, and Figs. 3, 4, and 5 are detail views.

My invention relates to attachments for plows; and it consists in the peculiar construction and arrangement of the parts, as hereinafter more fully set forth.

In the accompanying drawings, $a$ represents an inclined horizontal blade provided with a front cutting-edge, $b$. The inner end of the blade $a$ is provided with a shoulder, $c$, having a projection or arm, $d$, secured thereto. The arm $d$ terminates on its inner end in a threaded bolt, $e$, provided with a nut, $f$.

$g$ represents the standard of any plow of the usual construction, which standard is provided with a series of adjusting-holes, $i$, and a series of horizontal recesses, $j$, opposite the adjusting-holes and on each side thereof. The arm $d$ with its end-threaded bolt, $e$, is inserted into any one of the adjusting-holes $i$ desired, and secured therein by the nut $f$. The shoulder $c$, on the inner end of the blade, fits in the recesses $j$ on each side of the adjusting-hole, into which the arm $d$ is inserted. By this construction the blade can be secured to the plow-standard, and can be adjusted up or down, as desired, to suit the depth of furrow.

The blade $a$ may be cast so that when secured to the standard its outer end will be slightly elevated above its inner end, or the holes in the standard may be inclined, so as to elevate slightly the outer end of the blade above its inner end when the blade is secured to the standard, so that the blade in operation will pass above the roots of the plants cultivated. The cutting-edge of the blade $a$ projects out beyond the upper edge of the mold-board and in line therewith.

$k$ represents a wing firmly secured to the outer end of the blade and at right angles thereto, and parallel to the landside of the plow at its front end to the line $k'$, where the wing is bent inwardly, as shown at $k^2$, to carry the soil, weeds, &c., cut by the blade into the furrow made by the plow. The front end of the wing $k$ is provided with a downwardly-projecting hook, $k^3$, adapted to run under potato or other vines and cause them to ride over the upper edge of the wing, which is also rounded at $k^4$ to prevent the vines from being cut or bruised. The function of the shoulder at the inner end of the blade is to strengthen the latter, and, fitting into the recesses in the standard, more firmly secure the inner end of the blade to the standard.

In practice the attachment being secured to the plow-standard on the land side of the plow, will cut away a surface-slice of soil between the plow and the plants to be cultivated, removing the grass and weeds between the plow and plants, the soil and grass and weeds cut away beneath their roots being carried by the bent portion $k^2$ of the wing into the furrow in rear of the plow, the vines of plants—such as potatoes, melons, cucumbers, &c.—being raised and guided by the hooked portion of the wing and passing over its rounded upper edge, whereby they are prevented from being cut or bruised.

What I claim as my invention is—

1. The combination, with a plow, of an inclined blade, $a$, having its outer end slightly elevated above its inner end, and adjustably secured to the standard of the plow, and bent wing $k$ $k^2$ at right angles to the blade and secured thereto and having its upper edge rounded, substantially as described, and for the purpose set forth.

2. The plow attachment herein described, consisting of the inclined blade $a$, provided with the shoulder $c$, arm $d$, and threaded bolt $e$ at its inner end, bent wing $k$ $k^2$, secured to the outer end of the blade and having its upper edge rounded and provided with the downwardly-projecting hook $k^3$ at its front end, substantially as described, and for the purpose set forth.

3. The combination, with a plow-standard, $g$, provided with a series of adjusting-holes, $i$, and recesses $j$ opposite the adjusting-holes, of the inclined blade $a$, having its outer end slightly elevated above its inner end and provided with the shoulder $c$, arm $d$, and threaded bolt $e$ at its inner end, and bent wing $k\ k^2$, secured to the outer end of the blade and having its upper edge rounded, and hook $k^3$, secured to or integral with the front end of the wing, substantially as described, and for the purpose set forth.

THOS. P. WISE.

Witnesses:
CHAS. A. PETTIT,
SOLON C. KEMON.